April 16, 1963     F. S. C. BRANCO     3,086,157
MOTOR-CONTROL CIRCUIT

Filed April 11, 1960     3 Sheets-Sheet 1

INVENTOR:
Flavio S.C. Branco

Attorneys.

April 16, 1963 F. S. C. BRANCO 3,086,157
MOTOR CONTROL CIRCUIT

Filed April 11, 1960 3 Sheets-Sheet 2

INVENTOR:
Flavio S.C. Branco
Attorneys.

April 16, 1963  F. S. C. BRANCO  3,086,157
MOTOR CONTROL CIRCUIT
Filed April 11, 1960  3 Sheets-Sheet 3

INVENTOR:
Flavio S.C. Branco
Attorneys.

3,086,157
MOTOR CONTROL CIRCUIT
Flavio S. C. Branco, Los Angeles, Calif., assignor to Minnesota Mining and Manufacturing Company, St. Paul, Minn., a corporation of Delaware
Filed Apr. 11, 1960, Ser. No. 21,418
15 Claims. (Cl. 318—314)

This invention relates to speed control and regulating arrangements and, more particularly to such arrangements for controlling the speed of an adjustable electric motor.

There are many applications in which it is desirable to provide a constant speed electric drive. For example, in recording and reproducing television signals, radar signals, telemetering signals and the like, short period variations in the speed of the recording medium result in phase or angular modulation of the signals. Such variations may either be in the form of drift in the same speed direction or in the form of oscillations in speed about the desired operating speed of the recording medium. Either of these variations may destroy the usefulness of the recording or reproduction.

Various methods have been used to compensate for and minimize the phase modulation resulting from speed variations of an electric drive. Generally, these methods involve the use of a feedback system which varies the effective torque of a synchronous alternating current drive by developing an error signal proportional to the change in speed of the drive from a reference speed. These drives are bulky and expensive and introduce a flutter component to the signals due to the inertia or response time delay of the motor. Shunt type direct current motors are light, reliable and inexpensive but their speed varies readily with every variation in load and even more complex regulating equipment has been required for them than for the synchronous drives.

Direct current motors are generally utilized when variable speed drives are required. For example, in magnetic tape recording and reproducing systems, different tape speeds may be required so that the capstan motor driving the tape must be adjustable over a range of speeds. The present invention relates to such systems, and in a specific illustrative embodiment of this invention, tape speeds of 120, 60, 30, 15 and 7.5 inches per second are required. These tape speeds are provided utilizing a capstan having dimensions such that capstan speeds of 45, 22.5, 11.25, 5.625 and 2.8125 revolutions per second provide respectively for the above tape speeds. These values are typical for the variable speed systems to which this invention has particular application.

In order to regulate the speed of the capstan motor at each of the speed settings, it is necessary to develop a signal indicative of the instantaneous speed of the motor. Tachometer generators generally are utilized for providing a signal having a frequency indicative of the instantaneous speed of a motor. There are various types of tachometers including A.-C. induction tachometers, D.-C. tachometers, capacitor tachometers, drag-torque tachometers and permanent-magnet alternator tachometers. Each of these types of tachometers has a rotating member mechanically coupled to and driven by the rotor of the motor, and a stationary member adjacent which it rotates. The interaction between the rotating and stationary members produces the tachometer signal indicative of the motor speed.

The accuracy of the regulation of the motor speed depends, in part, upon the frequency of the developed tachometer signal; the higher the frequency, the better the regulation. With, however, small capstan speeds such as illustrated above, the frequency of the tachometer signal utilizing any of the prior tachometers is limited.

In the specific illustrative embodiment of this invention, a printed circuit D.-C. motor is utilized to drive the tape capstan and also to control the operation of a capacitive type tachometer. The tachometer has a first multitoothed rotor which is mechanically coupled to the printed rotor of the D.-C. motor and is accordingly driven by the D.-C. motor. The first rotor is concentrically positioned with a second multitoothed rotor which is also rotatable. The second rotor is driven in a direction opposite to that of the first rotor by a small synchronous motor. The tachometer is of the capacitive type, with a pulse being provided each time a tooth of the first rotor passes adjacent a tooth of the second rotor.

The frequency of the tachometer signal, accordingly, depends upon the sum of the speeds of the D.-C. motor and the synchronous motor. Though the speed of the D.-C. motor is restricted due to the relatively slow capstan speed requirements, the speed of the synchronous motor may be quite fast to provide tachometer signals of relatively high frequency. The speed of the D.-C. motor is regulated utilizing the high frequency tachometer signal and also a reference frequency signal. The phases of these two signals are compared by a phase discriminator which develops an error signal for introduction to the D.-C. motor. Since the speed of the D.-C. motor is regulated, the motor may be considered as "an adjustable motor" in accordance with the terminology used in the claims.

Further features of this invention relate to provisions of means for developing a tachometer signal having the same nominal frequency regardless of the speed settings of the D.-C. motor. To provide the same normal tachometer frequency for the different capstan speeds, the speed of the synchronous motor is automatically adjusted with changes of the D.-C. motor speed setting. By utilizing a constant frequency tachometer signal sharply tuned efficient amplifier circuits may be utilized.

Still further features of this invention pertain to the provision of means in a second embodiment for adjusting the synchronous motor speeds utilizing only one crystal oscillator. Other features of this invention relate to the provision of means for regulating the speed of the synchronous motor as well as the D.-C. motor.

Further advantages and features of this invention will become apparent upon consideration of the following description when read in conjunction with the drawing wherein.

Figure 1:
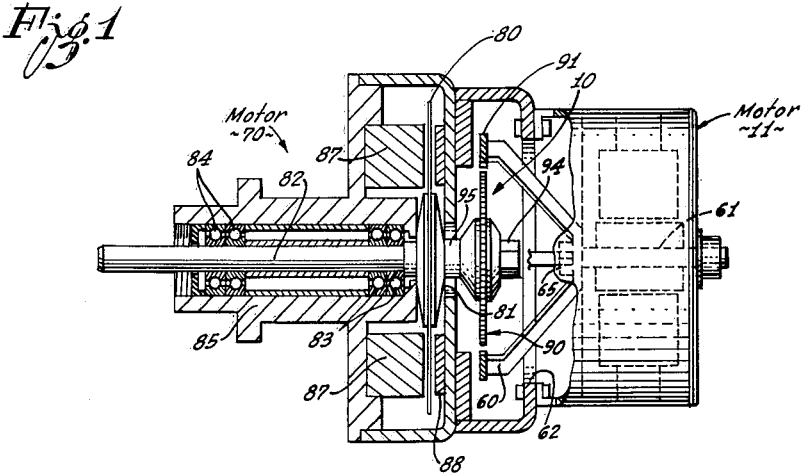
FIGURE 1 is a sectional view taken through the D.-C. and synchronous motors utilized in the motor control apparatus of this invention.
Figure 2:
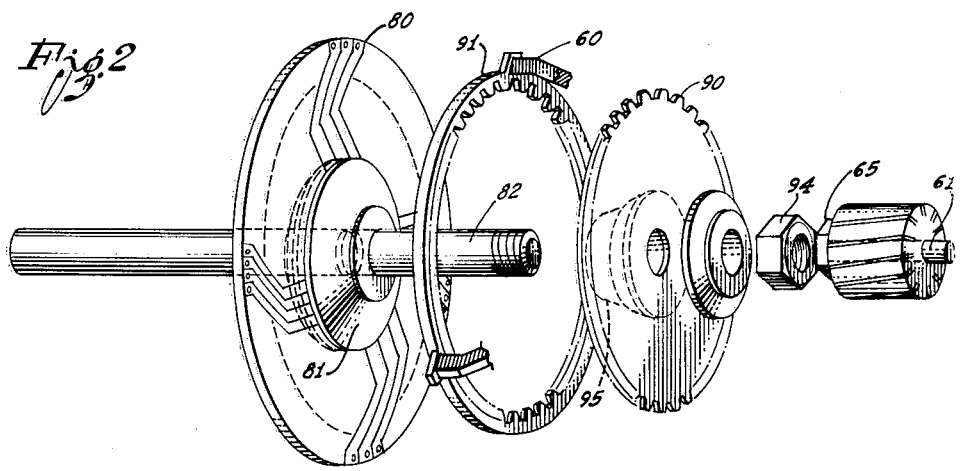
FIGURE 2 is an exploded view of some of the components of the D.-C. motor and of the double rotor tachometer utilized in the motor control apparatus of this invention.
Figure 3:
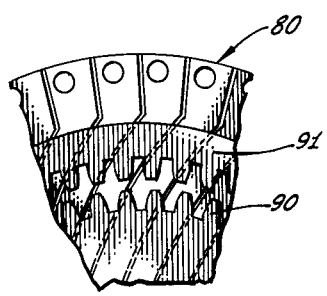
FIGURE 3 is a partial sectional view of the double rotor tachometer utilized in the motor control apparatus of this invention illustrating the relationship of the teeth of the two rotors.

Referring first to FIGURES 1 through 3, a printed circuit direct current motor 70 is depicted having a thin disk armature 80. The armature 80 has a large number of flat ribbon-like copper conductors printed on each of its faces. The conductors are a printed circuit equivalent of a multipolar wave winding of a conventional motor. The motor, illustratively, may be of the type PM368 manufactured by the Photocircuits Corporation of Glen Cove, New York, having a maximum speed of 4,500 revolutions per minute. As is hereinafter described, the direct current motor 70 is utilized to rotate a tape capstan of a magnetic tape recorder and reproducer at a number of different specific speeds.

The armature 80 of the motor 70 has an illustrative diameter of 3.5 inches and a weight of 2.5 ounces. The inertia of the armature 80 is, accordingly, quite small, illustratively 0.99 ounce-inch squared. The time required for the motor 70 to respond to a change of its input signal is quite small because of the small inertia of the armature and also because the armature inductance is small. With a small armature inductance, the electrical time constant and, therefore, the current rise time is small. The armature inductance may be so small that the input impedance may be considered as purely resistive. Illustratively, the response of the motor 70 may be more than 250 times as fast as conventional D.-C. motors.

The armature 80 is supported by a clamp 81 on an armature shaft 82 which may also be the capstan shaft for driving a magnetic tape, not shown. Illustratively, the magnetic tape may be driven at the particular speeds of 120, 60, 30, 15 and 7½ inches per second. For these tape speeds, the capstan may have dimensions such that the shaft 82 rotates respectively at speeds of 45, 22.5, 11.25, 2.625 and 2.8125 revolutions per second. The shaft 82 is supported in a housing 85 by two spaced apart bearings 83 and 84. The housing 85 also encloses the armature 80 and a number of permanent magnets 87 which are positioned adjacent to the armature 80. The successive magnets 87 have opposite polarities so that a magnetic circuit is formed from one magnet to the rest through the armature 80 and a ring 88 made of magnetic material. The motor 70 also includes a number of brushes, not shown, which may directly contact the conductors on the armature 80. Illustratively, there may be four such brushes.

In addition to the armature 80, the capstan shaft 82 also supports a first rotor 90 of a double rotor tachometer 10. The rotor 90 is held against a bushing 95 on the shaft 82 by a nut 94 threaded over the end of a shaft 82. The rotor 90 is made of electrically conductive material and forms a capacitive coupling with a second rotatable rotor 91 which is concentric with the rotor 90. Both of the rotors 90 and 91 have a relatively large number of teeth, illustratively, 350. The teeth of the rotors 90 and 91 do not mesh but are positioned adjacent to each other in a concentric relationship to form a capacitive element. The capacity between the sets of teeth varies with small differences in relative angular orientation of the rotors 90 and 91, with a maximum capacity being provided when the respective teeth are aligned radially or are directly opposite each other, and a minimum capacity being provided when the respective teeth are misaligned radially or at a maximum separation. The two rotors 90 and 91 are generally rotated in opposite directions so that a capacity variation is provided at a frequency dependent upon a number of teeth in each rotor and the relative speeds of rotation. For example, if each rotor has 350 teeth, and the two rotors 90 and 91 are driven in opposite directions at a differential speed of 3,000 revolutions per minute, the capacitance variation will occur at a frequency of 17.5 kc. per second. The capactive variation is the same if one of the rotors 90 and 91 has one tooth and the other has 350, but the maximum capacity between the rotors 90 and 91 is then 350 times as small. By providing the large number of teeth on both rotors 90 and 91 a relatively large signal may be provided from the tachometer 10.

A potential applied across the two rotors 90 and 91, accordingly, provides for a charging current varying at the frequency of the capacitive variation. As is hereinafter described, the signal developed by the double rotor tachometer 10 is utilized to control the speed of the D.-C. motor 10. The second rotor 91, as indicated above, is generally rotated in a direction opposite to that of the rotor 90. The rotor 91 is driven by a synchronous motor 11 which is operated at one of a number of predetermined speeds to control the speed of the direct current motor 70 and, accordingly, of the capstan shaft 82. The rotor 91 is in the form of a ring having inner teeth and the ring is supported by a hub bracket 60 on the shaft 61 of the synchronous motor 11. The bracket 60 is attached to the shaft 61 by a nut 65. The synchronous motor 11 may be quite small because it only drives the small bracket 60 and rotor 91. The hub bracket 60 extends through a circular opening 62 into the tachometer compartment which houses the rotors 90 and 91.

Figure 4:
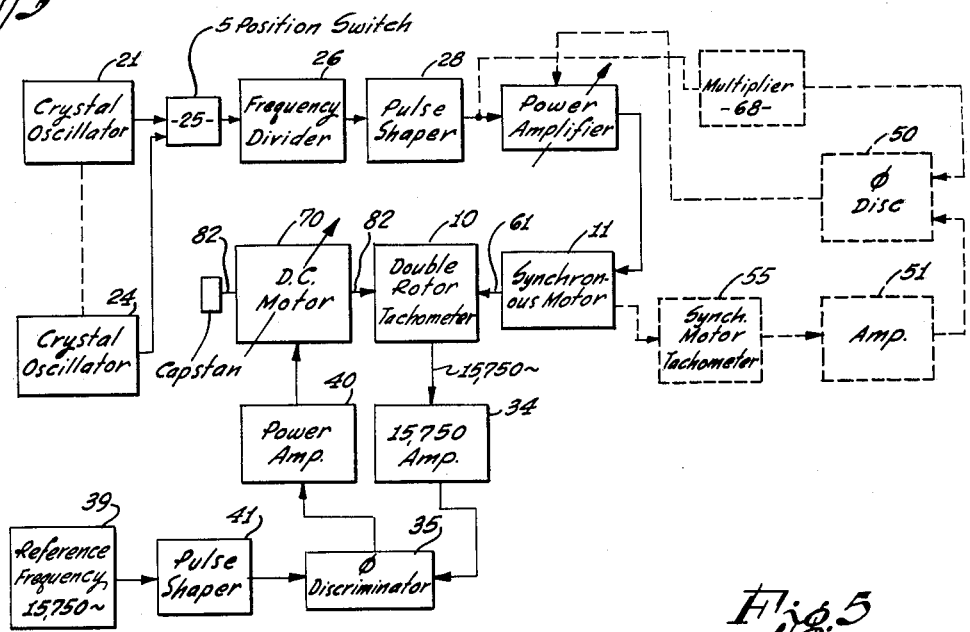
FIGURE 4 is a functional representation of one embodiment of the motor control apparatus of this invention in which the frequency of the tachometer signal is nominally constant with changes of the speed setting of the D.-C. motor.

The motor and tachometer apparatus shown in FIGURES 1-3 may be utilized in a motor control circuit illustrated in FIGURE 4. Referring to FIGURE 4, the synchronous motor 11 may be controlled by one of a number of crystal oscillators 21 through 24. The crystal oscillators 21 through 24 are relatively high frequency oscillators having frequencies, illustratively, of 23,040, 34,560, 40,320 and 43,200 cycles per second, respectively. The oscillators 21 through 24 are selectively connectable by a multi-position switch 25 to a frequency divider 26. Four positions of the switch 25 are utilized for selectively connecting the four oscillators 21 through 24 to a frequency divider 26, and a fifth position of the switch 25 is an open position so that no signal is provided to the divider 26.

The frequency divider 26 may be a binary type frequency divider which divides the frequency, illustratively, by 256 ($2^8$). Depending, therefore, upon which one of the four different frequency signals is provided to the divider 26, the output frequency from the divider 26 is 90, 135, 157.5 or 168.75 cycles per second. The relatively low frequency signal is coupled through a pulse shaper 28 to a power amplifier 30 which controls the synchronous motor 11. The speed of the synchronous motor 11, accordingly, is determined by the setting of the five-position switch 25. When the switch 25 is in its open position so that none of the crystal oscillators 21-24 are coupled to the divider 26, the synchronous motor 11 is stationary.

As described above in reference to FIGURES 1-3, the synchronous motor 11 is coupled to the double rotor tachometer and together with the D.-C. motor 70, which is also coupled to the tachometer 10, controls the operation of the tachometer 10. When the synchronous motor 11 is stationary responsive to the setting of the switch 25 to its fifth or open position, the rotor 91 is stationary. The signal developed by the double rotor tachometer 10 is utilized in a feedback arrangement to control the speed of the D.-C. motor 70. The nominal frequency of the tachometer signal is 15,750 cycles per second regardless of the setting of the switch 25. This constant nominal tachometer frequency is achieved, as is hereinafter further described, by varying the speeds of the two motors 70 and 11 in opposite directions so as to maintain a constant different frequency at the double rotor tachometer 10.

The tachometer signal is provided from the tachometer 10 to an amplifier 34, and the amplified tachometer signal from the amplifier 34 is provided as one input to a phase discriminator 35. The amplifier 34 may be a tuned amplifier with the peak response being for 15,750 cycles per second. The other input to the phase discriminator 35 is provided from a reference frequency source 39 through a pulse shaper 41. The reference frequency source 39 may be a crystal oscillator having a frequency of oscillation of 15,750 cycles per second. The phase discriminator 35 develops an error signal indicative of any difference in phase between the amplified tachometer signals and the reference signal from the pulse shaper 41.

The error signal is introduced to a power amplifier 40 which controls the speed of the D.-C. motor 70. Any change in frequency of the tachometer signal, either due to the operation of the five-position switch 25 or due to a variation in speed of the D.-C. motor 70, provides for an error signal which adjusts the speed of the motor 70 to change the tachometer signal back to the 15,750 cycle nominal frequency.

In order to readily understand how the nominal tachometer frequency is the same for all five speed settings the mathematical relationships are considered. The tachometer frequency is given by the following relationship:

$$F_t = (N_s + N_c)n$$

where $F_t$ is the tachometer frequency, $N_s$ is the speed of the synchronous motor 11; $N_c$ is the speed of the D.-C. motor 70; and $n$ is the number of teeth of each of the rotors 90 and 91. The synchronous speed is equal to $F_s/p$; where $F_s$ is the frequency of the signal provided to the motor 11; and P is the number of pairs of poles of the synchronous motor 11. By substituting this latter equation for the synchronous motor speed $N_s$ in the equation for the tachometer frequency $F_t$, $$F_t = (F_s/p + N_c)n$$

If the number of pairs of poles of the motor 11 is 4, and the number of rotor teeth is 350, then $$F_t = (F_s + 4N_c)(82.5)$$

In other words, the change of frequency of the signal to the synchronous motor 11 is four times the change of speed of the D.-C. motor 70 to provide for a constant tachometer frequency. Further, if the frequency of the signal to the synchronous motor 11 is changed in one direction (as by the switch 25), the speed of the motor 70 will change in the opposite direction by one-fourth the frequency of the signal to the motor 11.

The following table further illustrates this relationship:

| Tape Speed, inches/ sec. | Capstan Speed, rev./sec. | $F_t$, cycles/sec. | $F_s$, cycles/sec. | Oscillator Frequency cycles/sec. |
| --- | --- | --- | --- | --- |
| 120 | 45 | 15,750 | 0 | 0 |
| 60 | 22.5 | 15,750 | 90 | 23,040 |
| 30 | 11.25 | 15,750 | 135 | 34,560 |
| 15 | 5.625 | 15,750 | 157.5 | 40,320 |
| 7.5 | 2.8125 | 15,750 | 168.75 | 43,200 |

$F_s$, the frequency of the signal to the motor 11, varies by a factor of 4 with variations of capstan speed because the motor 11 has 4 pairs of poles. If 3 pairs of poles are utilized instead of 4, the frequency varies by a factor of 3.

The various values given as illustrations above for the frequencies of the oscillators 21 through 24 for the tachometer frequency and for the capstan speeds are governed by their mathematical relationships. In this manner, the capstan shaft 82 is directly driven without requiring gearing linkages by a D.-C. motor 70 at relatively slow speeds and yet relatively high frequency tachometer signals are generated for accurately regulating the speed of the motor 70. The relatively high frequency tachometer signals are developed without frequency multiplying circuitry, as the output of the tachometer 10 itself is the relatively high frequency signal.

In addition to driving the synchronous motor 11 in the opposite direction of the motor 70 or halting the synchronous motor 11, the synchronous motor can be driven in the same direction as the D.-C. motor 70 if so desired to develop very low frequency signals. Illustratively, frequencies approaching non-varying or D.-C. signals can readily be developed if the synchronous motor is driven at a slightly different speed than the D.-C. motor but in the same direction. Because of this, the term "sum" as used in the claims to define the speed of the tachometer is intended to cover arithmetic sums and differences.

Figure 6:
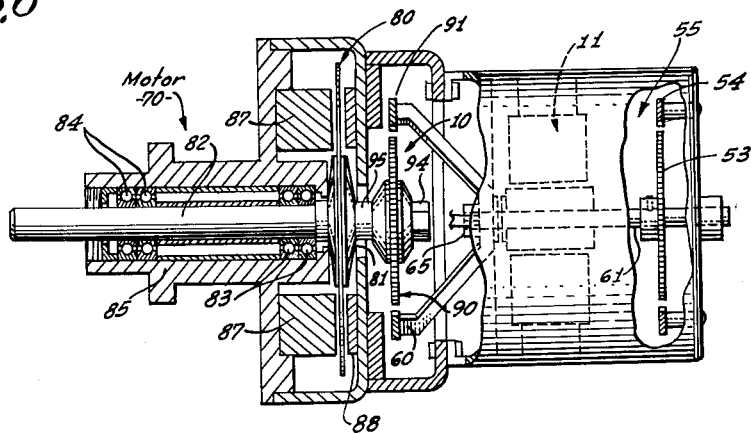
FIGURE 6 is a sectional view through another embodiment of control apparatus of this invention in which a number of tachometers are utilized.

As shown by the dash or phantom boxes in FIGURE 4, a feedback regulating arrangement may be provided for the synchronous motor 11 as well as the D.-C. motor 70. When a feedback arrangement or regulating loop is utilized for the synchronous motor 11, the control equipment illustrated in FIGURE 6 instead of the equipment illustrated in FIGURE 1 is utilized. The speed of the synchronous motor 11 is actually quite stable because the total load of the synchronous motor 11 is only the outer rotor 91 of the double rotor tachometer 10 and bearing friction. Due, however, to any changes in bearing friction, either due to aging or due to dust, etc., the phasing of the synchronous motor 11 may change slightly even though the control signals from the oscillators 21 through 24 do not change in frequency or phase. To correct for any such phase shift, a regulating feedback loop may be provided for the motor 11. The signals from the pulse shaper 28 are introduced to a frequency multiplier 68 which increases the frequency of the signals by a factor $n$ equal to the number of teeth of a rotor 53 (FIGURE 6). As is hereinafter described, the rotor 53 is part of a single rotor tachometer 55 and may illustratively have 256 teeth. The frequency multiplied signal is introduced from the multiplier 68 as one input to a phase discriminator 50. The other input to the phase discriminator 50 is provided through an amplifier 51 from the tachometer 55.

The tachometer 55 is utilized in addition to the double rotor tachometer 10 when the synchronous motor 11 is being regulated as well as the D.-C. motor 70. FIGURE 6 illustrates the arrangement of the motors 70 and 11 and of the tachometers 10 and 55. The various components in FIGURE 6 which are the same as corresponding ones in FIGURES 1–3 have similar reference designations. The shaft 61 of the synchronous motor 11 is extended to support the rotor 53. The tachometer 55 may be identical to the tachometer 10 except that the rotor 54 is stationary so that the signal developed thereby is indicative solely of the synchronous motor speed. As indicated above, each of the rotors 53 and 54 may have 256 teeth. This particular number, which is a binary number, is selected to ease the requirements on the frequency multiplier 68. Actually, if the number of rotor teeth is 256, the first input to the phase discriminator 50 may be coupled directly from the switch 25 instead of through a chain including the frequency divider 26 and the frequency multiplier 68. The frequency multiplication is provided to increase the design flexibility so that the number of rotor teeth of the tachometer 55 may be different than the frequency divider.

To illustrate the relationship of the tachometer signal frequency assume that the capstan speed is 22.5 revolutions per second, and the speed of the synchronous motor is also 22.5 revolutions per second so that the difference in relative speeds is 45 revolutions per second. With 350 teeth on each of the rotors 90 and 91 in the tachometer 10, the tachometer frequency from the tachometer 10 is 350 times 45 or 15,750 cycles per second. The frequency of the tachometer signal, however, from the tachometer 55 is 22.5 times 256 or 5,760 cycles per second which is less than one-half the frequency from the tachometer 10. If the number of rotor teeth in the two tachometers 10 and 55 are the same, the frequency of the signal from the tachometer 55 for the above illustration would be exactly one-half the frequency of the tachometer signal from the tachometer 10.

In this manner, the synchronous motor 11, as well as the D.-C. motor 70, is regulated. By regulating the motor 11, the regulation of the D.-C. motor 70 is effectively improved because the rotor 91 rotates at a more constant speed.

In the embodiment described above in reference to FIGURE 4, the nominal tachometer frequency from the double rotor tachometer 10 is constant at an illustrative value of 15,750 cycles per second. In the embodiment of the invention shown in FIGURE 5, the tachometer frequency varies but a single crystal oscillator may be utilized to control the different speeds of the synchronous motor and accordingly of the D.-C. motor. The various components in FIGURE 5, which are similar to corresponding components in FIGURE 4, have been given the same reference designation with the addition of 100. For example, the designation of the synchronous motor in FIGURE 5 is 111 whereas in FIGURE 4 the designation is 11.

Figure 5:
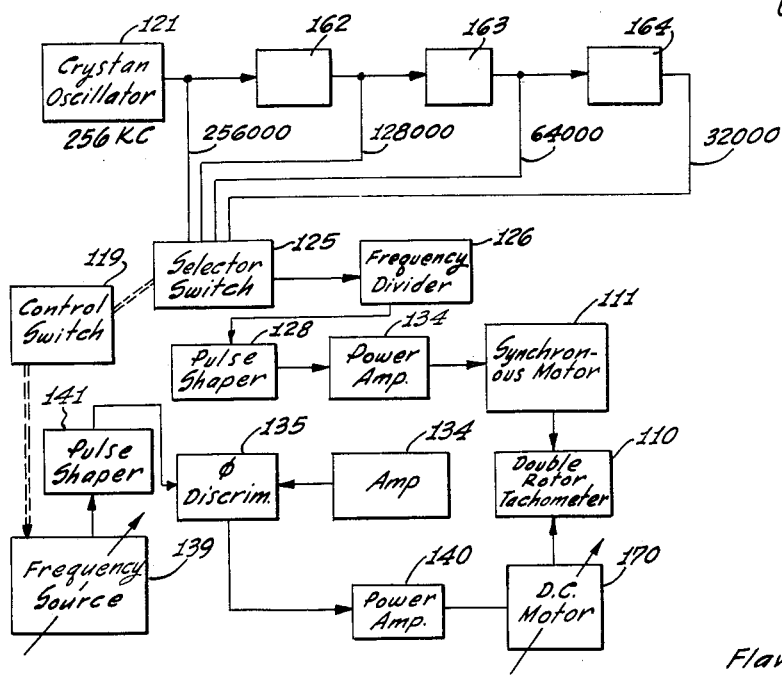
FIGURE 5 is a functional representation of a second embodiment of the motor control apparatus of this invention in which only one crystal oscillator is utilized for controlling the different speeds of the D.-C. motor.

Referring now to FIGURE 5, the motors 111 and 170 and the double rotor tachometer 110 are identical to their corresponding components in FIGURE 4. A single crystal oscillator 121 provides a signal at a nominal frequency of 256 kc. to a frequency divider chain which may be binary in form. The chain consists of a serially connected arrangement of bistable circuits 162 through 164. The signals from the various circuits 162 through 164 are provided to a multiposition selector switch 125. The particular frequency provided, therefore, through the frequency divider 126, the pulse shaper 128 and the power amplifier 140 to the synchronous motor 111 is determined by the setting of the switch 125. The switch 125 also has an open position for blocking signals to the motor 111.

The tachometer signal from the tachometer 110 is provided through the amplifier 134 to the phase discriminator 135. The other input of the phase discriminator 135 is provided through the pulse shaper 140 from an adjustable frequency source 139. The frequency of the source 139 is determined by the setting of a control switch 119. The switch 119 may be ganged to the selector switch 125 so that the frequency source 139 is adjusted when the selector switch 125 is operated. The source 139 is adjusted to provide a signal having a reference frequency such as to provide for the desired capstan speed.

The mathematical relationships governing the operation of the system shown in FIGURE 5 is similar to that described above in reference to FIGURE 4, $$F_t = (F_{s/p} + N_c)n$$

Where $F_t$ is the tachometer frequency, $F_s$ is the frequency of the input to the synchronous motor 111, P is the number of pairs of poles of the motor 111, $N_c$ is the speed of the motor 170 and $n$ is the number of rotor teeth. For example, if $p=4$ and $n=350$ and the switch is set at its open position, $F_t = 45$ times 350 or 15,750 cycles per second. The source 139 is accordingly adjusted by the switch 119 to 15,750 cycles per second when the switch 125 is set to its open position. The following table illustrates the different settings of the source 139 for the different settings of the switch 125 in order to provide for the particular capstan speeds of 45, 22.5, 11.25, 5.625 and 2.8125 revolutions per second:

| Capstan Speed | $F_s$ to motor 111, c.p.s. | Setting of source 139, c.p.s. |
| --- | --- | --- |
| 45 | 0 | 17,570 |
| 22.5 | 125 | 18,725 |
| 11.25 | 250 | 25,813 |
| 5.625 | 500 | 45,719 |
| 2.8125 | 1,000 | 88,480 |

The particular values are only illustrative and are utilized to demonstrate that the speed settings may readily be determined utilizing a single crystal oscillator 121.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. In a motor control circuit, an adjustable motor to be regulated, an adjustable tachometer coupled to the motor for generating a signal having an output frequency, and control means coupled to the adjustable tachometer and responsive to different speeds of the motor for adjusting the operation of the tachometer in accordance with the different speeds of the adjustable motor to maintain the signal from the adjustable tachometer at a substantially constant output frequency.

2. In a motor control circuit, an adjustable motor to be regulated having a number of different predetermined operating speeds, a control motor, a tachometer coupled to said adjustable motor and to said control motor and jointly controlled by said adjustable motor and said control motor to generate a signal in accordance with the speeds and direction of rotation of the adjustable motor and the control motor, and a feedback circuit between said tachometer and said adjustable motor for regulating the speed of the adjustable motor.

3. In a control arrangement, a first motor; a double rotor tachometer having a first rotor mechanically coupled to said first motor and rotated by said first motor, a second rotor capacitively coupled to said first rotor, and means for generating a signal between said first and said second rotors dependent upon the speed and the directions of movement of said first and said second rotors; and a second motor mechanically coupled to said second rotor for rotating said second rotor in a direction relative to the direction of rotation of said first rotor to develop a signal having a frequency related to the sum of the rotational speeds of said first and said second motors.

4. In a control arrangement, a first motor; a double rotor tachometer having a first rotor mechanically coupled to said first motor and rotated by said first motor, a second rotor capacitively coupled to said first rotor, and means for generating a signal between said first and said second rotors related to the difference in speed between said first and said second rotors; a second motor mechanically coupled to said second rotor for rotating said second rotor in a direction relative to the direction of rotation of said first rotor to develop a signal having a frequency related to the directions of rotation of said first and said second rotors and the speeds of such rotations, a source of a reference frequency signal; means coupled to said source and to said double rotor tachometer for comparing the frequency of said reference frequency signal with the frequency of the generated signal between said first and said second rotors of said double rotor tachometer and for developing a control signal in accordance with any difference therebetween, and means coupled to said first motor and to said comparing means for introducing the control signal to said first motor for regulating the speed of said first motor.

5. In a control arrangement in accordance with claim 4 wherein said second motor is a synchronous motor, and including in addition a source of reference frequency signals coupled to said second motor for controlling the speed of said second motor.

6. In a control arrangement in accordance with claim 5, in addition, a switching circuit coupled to said second-mentioned source of reference frequency signals for controlling the frequency of the signals introduced to said second motor whereby the speed of said first motor as well as of said second motor is controlled.

7. In a motor control circuit, an adjustable motor to be regulated having a number of different predetermined operating speeds, a control motor, a tachometer coupled to said adjustable motor and to said control motor and jointly controlled by said adjustable motor and said control motor to generate a signal in accordance with the speeds of the adjustable motor and the control motor, means coupled to said control motor and the directions of rotation of the adjustable motor and the control motor for adjusting the speed of said control motor to change the signal generated by said tachometer, a source of a reference signal, comparator means coupled to said source and to said tachometer signal to determine any difference between the tachometer and reference signals, and means coupled to said comparator means for controlling the speed of said adjustable motor in accordance with the determined difference between the tachometer signal and the reference signal.

8. In a motor control circuit, an adjustable motor to be regulated having a number of different predetermined operating speeds, a control motor, a tachometer coupled to said adjustable motor and to said control motor and jointly controlled by said adjustable motor and said control motor to generate a signal in accordance with the speeds of the adjustable motor and the control motor and the directions of rotation of the adjustable motor and the control motor, means coupled to said control motor for adjusting the speed of said control motor to change the frequency of the signal generated by said tachometer, a signal source of constant frequency, a phase discriminator for comparing the phase of the signal generated by said tachometer with the phase of the constant frequency signal from said source and for developing a control signal in accordance with the differences in phase therebetween, and means coupled to said adjustable motor for introducing the control signal from said phase discriminator to said adjustable motor to change the speed of said adjustable motor in a direction to reduce the difference in phase between the signal generated by said tachometer and the constant frequency signal from said source.

9. In a motor control circuit, an adjustable motor to be regulated having a number of different predetermined operating speeds, a control motor, a tachometer coupled to said adjustable motor and to said control motor and jointly controlled by said adjustable motor and said control motor to generate a signal in accordance with the speeds of the adjustable motor and the control motor and the directions of rotation of the adjustable motor and the control motor, said tachometer including a first rotor coupled to said adjustable motor and rotated by said adjustable motor, a second rotor positioned adjacent said first rotor to form a variable capacitor therewith, said second rotor being mechanically coupled to said control motor for rotation by said control motor, means coupled to said control motor for adjusting the speed of said control motor to change the signal generated by said tachometer, a source of a reference signal, comparator means coupled to said source and to said tachometer for comparing the tachometer signal with the reference signal to determine any difference therebetween, and means coupled to said comparator means and to said speed-adjusting means for controlling the speed of said adjustable motor in accordance with the determined difference between the tachometer signal and the reference signal.

10. In a motor control circuit, an adjustable motor to be regulated having a number of different predetermined operating speeds, a control motor, a tachometer coupled to said adjustable motor and to said control motor and jointly controlled by said adjustable motor and said control motor to generate a signal in accordance with the speeds of the adjustable motor and the control motor and the directions of rotation of the adjustable motor and the control motor, said tachometer including a first rotor coupled to said adjustable motor and rotated by said adjustable motor, a second rotor positioned adjacent said first rotor to form a variable capacitor therewith, said second rotor being mechanically coupled to said control motor for rotation by said control motor, means coupled to said control motor for adjusting the speed of said control motor to change the frequency of the signal generated by said tachometer, a signal source of constant frequency, a phase discriminator for comparing the phase of the signal generated by said tachometer with the phase of the constant frequency signal from said source and for developing a control signal in accordance with the differences in phase therebetween, and means coupled to said adjustable motor for introducing the control signal from said phase discriminator to said adjustable motor to change the speed of said adjustable motor in a direction to reduce the difference in phase between the signal generated by said tachometer and the constant frequency signal from said source.

11. In a motor control circuit, an adjustable motor to be regulated having a number of different predetermined operating speeds, a control motor, a tachometer coupled to said adjustable motor and to said control motor and jointly controlled by said adjustable motor and said control motor to generate a signal in accordance with the speeds and direction of rotation of the adjustable motor and the control motor, a feedback circuit between said tachometer and said adjustable motor for regulating the speed of the adjustable motor, a tachometer mechanically coupled to said control motor for generating a signal related to the speed of said control motor, and a feedback circuit between said second-mentioned tachometer and said control motor for regulating the speed of said control motor.

12. In a control arrangement, a first motor; a double rotor tachometer having a first rotor mechanically coupled to said first motor and rotated by said first motor, a second rotor capacitively coupled to said first rotor, and means for generating a signal between said first and said second rotors related to the speeds and directions of rotation of said first and said second rotors; a second motor mechanically coupled to said second rotor for rotating said second rotor in a direction related to the direction of rotation of said first rotor to develop a signal having a frequency related to the rotational speeds of said first and said second motors and the relative directions of rotation of such motors, and a single rotor tachometer having a rotor mechanically coupled to said second motor and rotated by said second motor, a stator capacitively coupled to said rotor of said single rotor tachometer, and means for generating a signal between said stator and said rotor of said single rotor tachometer related to the speed of said rotor of said single rotor tachometer.

13. In a control arrangement, a first motor; a double rotor tachometer having a first rotor mechanically coupled to said first motor and rotated by said first motor, a second rotor capacitively coupled to said first rotor, and means for generating a signal between said first and said second rotors related to the speeds and directions of rotation of said first and said second rotors; a second motor mechanically coupled to said second rotor for rotating said second rotor in a direction relative to the direction of rotation of said first rotor to develop a signal having a frequency related to the rotational speeds and directions of rotation of said first and said second motors, a single rotor tachometer having a rotor mechanically coupled to said second motor and rotated by said second motor, a stator capacitively coupled to said rotor of said single rotor tachometer, means for generating a signal between said stator and said rotor of said single rotor tachometer related to the speed of said rotor of said single rotor tachometer, a source of a reference frequency signal; means coupled to said source and to said double rotor tachometer for comparing the frequency of said reference frequency signal with the frequency of the generated signal between said first and said second rotors of said double rotor tachometer and for developing a control signal in accordance with any difference therebetween, and means coupled to said first motor and to said comparing means for introducing the control signal to said first motor for regulating the speed of said first motor.

14. In a control arrangement in accordance with claim 13 wherein said second motor is a synchronous motor, and including in addition a source of reference frequency signals coupled to said second motor for controlling the speed of said second motor.

15. In a control arrangement, a first motor; a double rotor tachometer having a first rotor mechanically coupled to said first motor and rotated by said first motor, a second rotor capacitively coupled to said first rotor, and means for generating a signal between said first and said second rotors related to the speeds and directions of rotation of said first and said second rotors; a second motor mechanically coupled to said second rotor for rotating said second rotor in a direction relative to the direction of rotation of said first rotor to develop a signal having a frequency related to the rotational speeds and the directions of rotation of said first and said second motors, a source of a reference frequency signal; means coupled to said source and to said double rotor tachometer for comparing the frequency of said reference frequency signal with the frequency of the generated signal between said first and said second rotors of said double rotor tachometer and for developing a control signal in accordance with any difference therebetween, means coupled to said first motor and to said comparing means for introducing the control signal to said first motor for regulating the speed of said first motor, a source of a reference frequency signal coupled to said second motor for controlling the speed of said second motor, and switching means coupled to said first-mentioned source and to said second-mentioned source for simultaneously adjusting them to determine one of a number of particular operating speeds of said first motor.

References Cited in the file of this patent
UNITED STATES PATENTS
2,528,467    Bulliet _____ Oct. 31, 1950